United States Patent
Wenzel et al.

(10) Patent No.: US 9,020,010 B2
(45) Date of Patent: Apr. 28, 2015

(54) TRANSFER OF ENCODED DATA

(71) Applicant: Intel Mobile Communications GmbH, Neubiberg (DE)

(72) Inventors: Dietmar Wenzel, Munich (DE); Bernd Adler, Neubiberg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/656,806

(22) Filed: Oct. 22, 2012

(65) Prior Publication Data

US 2013/0044794 A1   Feb. 21, 2013

Related U.S. Application Data

(63) Continuation of application No. 12/266,647, filed on Nov. 7, 2008, now Pat. No. 8,315,293.

(30) Foreign Application Priority Data

Nov. 12, 2007   (DE) .......................... 10 2007 053 828

(51) Int. Cl.
*H04B 1/38* (2006.01)
*H04L 27/00* (2006.01)
*H04B 1/40* (2006.01)
*H04L 27/20* (2006.01)
*H04L 27/34* (2006.01)

(52) U.S. Cl.
CPC .............. *H04L 27/0008* (2013.01); *H04B 1/40* (2013.01); *H04L 27/2017* (2013.01); *H04L 27/206* (2013.01); *H04L 27/34* (2013.01)

(58) Field of Classification Search
CPC ........ H04B 1/40; H04B 1/406; H04B 1/0003; H04L 1/0003; H04L 1/0009
USPC ................................... 375/219, 257, 295, 316
See application file for complete search history.

(56) References Cited

U.S. PATENT DOCUMENTS

| | | | |
|---|---|---|---|
| 8,195,225 B2 * | 6/2012 | Lin et al. ..................... | 455/553.1 |
| 2003/0063684 A1 * | 4/2003 | Czekaj et al. ................. | 375/295 |
| 2005/0152314 A1 | 7/2005 | Sun et al. | |
| 2005/0152473 A1 | 7/2005 | Maltsev et al. | |
| 2006/0045140 A1 * | 3/2006 | Walker et al. ................. | 370/529 |
| 2006/0059280 A1 * | 3/2006 | Gossmann et al. ............ | 710/58 |
| 2006/0176968 A1 | 8/2006 | Keaney et al. | |
| 2007/0037511 A1 * | 2/2007 | Capretta ..................... | 455/3.01 |
| 2008/0242301 A1 * | 10/2008 | Osterling et al. ............. | 455/436 |

FOREIGN PATENT DOCUMENTS

WO   WO 2006109435 A1 *  10/2006  ............... H04Q 7/38

OTHER PUBLICATIONS

Non-Final Office Action dated Jan. 26, 2012 for U.S. Appl. No. 12/266,647. 20 Pages.
Notice of Allowance dated Jul. 20, 2012 for U.S. Appl. No. 12/266,647. 15 Pages.

* cited by examiner

*Primary Examiner* — Shuwang Liu
*Assistant Examiner* — David S Huang
(74) *Attorney, Agent, or Firm* — Eschweiler & Associates, LLC

(57) ABSTRACT

The invention relates to a method that includes transfer of data encoded on the basis of a first encoding scheme via an interface between a baseband assembly and a radio-frequency assembly of a mobile radio transceiver. The method further includes transfer of a data sequence which is encoded on the basis of the first encoding scheme and which identifies a change of encoding scheme from the first encoding scheme to a second encoding scheme. Lastly, the method includes transfer of data encoded on the basis of the second encoding scheme via the interface.

11 Claims, 12 Drawing Sheets

FIG 2
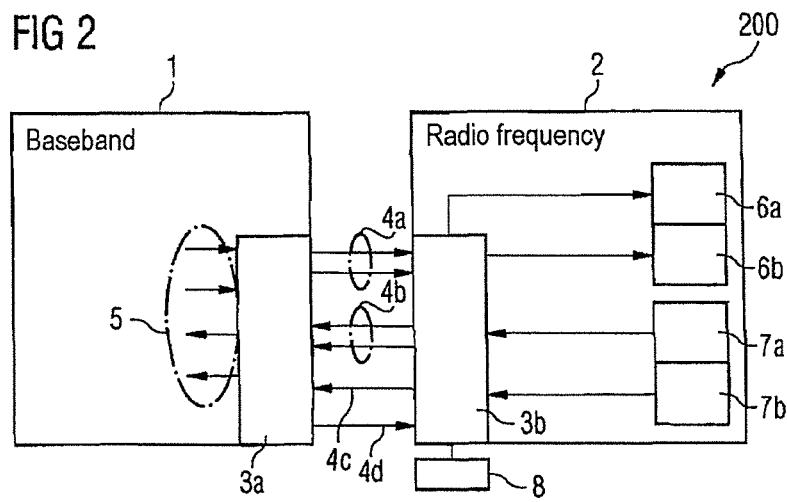
FIG 3
| RED HOT A | RED HOT B | HUGE A | HUGE B | HUGE C |
|---|---|---|---|---|
| GMSK<br>8PSK<br>16QAM<br>32QAM | QPSK<br>16QAM<br>32QAM | GMSK<br>8PSK<br>16QAM | QPSK<br>16QAM | QPSK<br>16QAM<br>32QAM |
FIG 4
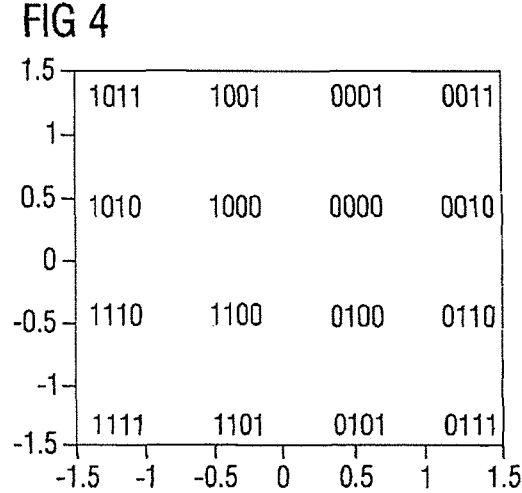

FIG 5
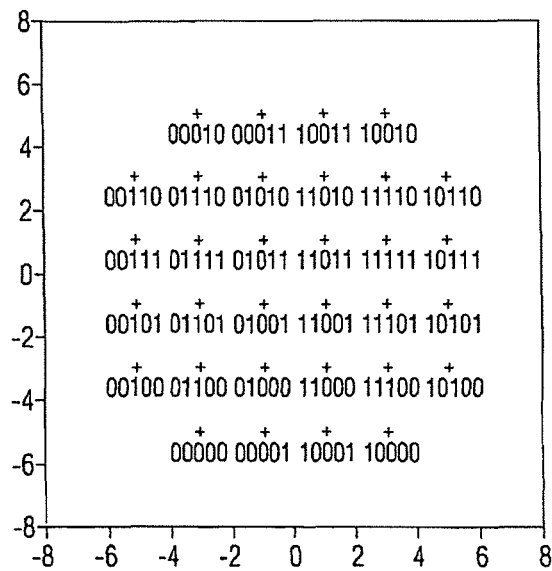
FIG 6
| Modulation | Rotation [rad] |
|---|---|
| GMSK | $\pi/2$ |
| QPSK | $3\pi/4$ |
| 8PSK | $3\pi/8$ |
| 16QAM | $\pi/4$ |
| 32QAM | $-\pi/4$ |
FIG 7
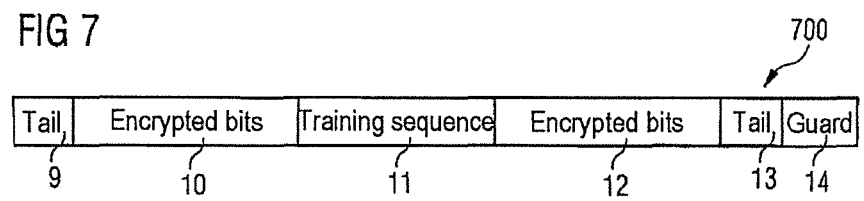

| Field | RED HOT A HUGE A | RED HOT B HUGE B+C |
|---|---|---|
| Tail (left) | 3 | 4 |
| Encrypted bits (left) | 58 | 69 |
| Training sequence | 26 | 31 |
| Encrypted bits (right) | 58 | 69 |
| Tail (right) | 3 | 4 |
| Guard | 8.25 | 10.50 |
| Total | 156.25 | 187.50 |

| Sync | Header | Payload data |
|---|---|---|
| 15 | 16 | 17 |

| Size encoding | Payload data size (bits) | Total size of the frame (bits) |
|---|---|---|
| 000 | 8 | 32 |
| 001 | 32 | 56 |
| 010 | 64 | 88 |
| 011 | 96 | 120 |
| 100 | 128 | 152 |
| 101 | 256 | 280 |
| 110 | 512 | 536 |
| 111 | Reserved | - |

FIG 11

| Channel encoding | Logical channel type |
|---|---|
| 0000 | Interface control |
| 0001 | Time Accurate Strobe Message |
| 0010 | RF IC control |
| 0011 | Reserved for future applications |
| 0100 | Data channel A |
| 0101 | Data channel B |
| 0110 | Data channel C |
| 0111 | Data channel D |
| 1000 | Data channel E |
| 1001 | Data channel F |
| 1010 | Data channel G |
| 1011. | Data channel H |
| 1100...111 | Reserved for future applications |

FIG 12

| Logical channel type | Rx Data | Tx Data |
|---|---|---|
| Data channel A | 2.5G Primary | 2.5G |
| Data channel B | 2.5G Diversity | Reserved |
| Data channel C | 3G Primary | 3G 12 bit |
| Data channel D | 3G Diversity | Reserved |
| Data channel E | Reserved | 3G 16 bit |
| Data channel F-H | Reserved | Reserved |

FIG 13

| 3 MS bits | LS bits | Encoding |
|---|---|---|
| 000 | 0 | GMSK '0' |
| 001 | 0 | GMSK '1' |
| 010...110 | 0 | Reserved for future applications |
| 111 | 0 | End of data symbol (see text) |
| $d_{3i+2}, d_{3i+1}, d_{3i}$ | 1 | 8PSK modulated data need to be transmitted as original unmapped bits. The symbol mapping prescribed in section 3.2 in 3GPP TS 45.004 needs to be performed by the RF IC. |

FIG 14

| 3 MS bits | LS bits | Encoding |
|---|---|---|
| 000 | 0 | GMSK '0' |
| 001 | 0 | GMSK '1' |
| 010...101 | 0 | Reserved for future applications |
| 110 | 0 | SOH; Start of HUGE data symbol sequence |
| 111 | 0 | EOD; End of data symbol |
| $d_{3i+2}, d_{3i+1}, d_{3i}$ | 1 | 8PSK modulated data need to be transmitted as original unmapped bits. The symbol mapping prescribed in section 3.2 in 3GPP TS 45.004 needs to be performed by the RF IC. |

FIG 15

| 5 MS bits | 3 LS bits | Encoding |
|---|---|---|
| 00000 | 000 | HUGE A GMSK '0' |
| 00001 | 000 | HUGE A GMSK '1' |
| 00010...11101 | 000 | Reserved for future applications |
| 11110 | 000 | EOH, end of HUGE data symbol sequence |
| 11111 | 000 | EOD; End of data symbol |
| 0, 0, 0, $d_{2i+1}$, $d_{2i}$ | 001 | HUGE B/C QPSK-modulated data need to be transmitted as original unmapped bits. The symbol mapping prescribed in 3GPP TS 45.004 rep. GERAN #34 needs to be performed by the RF IC. |
| 00100...11111 | 001 | Reserved for future applications |
| 0, 0, $d_{3i+2}$, $d_{3i+1}$, $d_{3i}$ | 010 | HUGE A 8PSK-modulated data need to be transmitted as original unmapped bits. The symbol mapping prescribed in section 3.2 in 3GPP TS 45.004 needs to be performed by the RF IC. |
| 01000...11111 | 010 | Reserved for future applications |
| 0, $d_{4i+3}$, $d_{4i+2}$, $d_{4i+1}$, $d_{4i}$ | 011 | HUGE A 16 QAM-modulated data need to be transmitted as original unmapped bits. The symbol mapping prescribed in 3GPP TS 45.004 rep. GERAN #34 needs to be performed by the RF IC. |
| 10000...11111 | 011 | Reserved for future applications |
| 0, $d_{4i+3}$, $d_{4i+2}$, $d_{4i+1}$, $d_{4i}$ | 100 | HUGE B/C 16QAM-modulated data need to be transmitted as original unmapped bits. The symbol mapping prescribed in 3GPP TS 45.004 rep. GERAN #34 needs to be performed by the RF IC. |
| 10000...11111 | 100 | Reserved for future applications |
| $d_{5i+4}$, $d_{5i+3}$, $d_{5i+2}$, $d_{5i+1}$, $d_{5i}$ | 101 | HUGE C 32QAM-modulated data need to be transmitted as original unmapped bits. The symbol mapping prescribed in 3GPP TS 45.004 rep. GERAN #34 needs to be performed by the RF IC. |
| 00000...11111 | 110 | Reserved for future applications |
| 00000...11111 | 111 | Reserved for future applications |

FIG 16

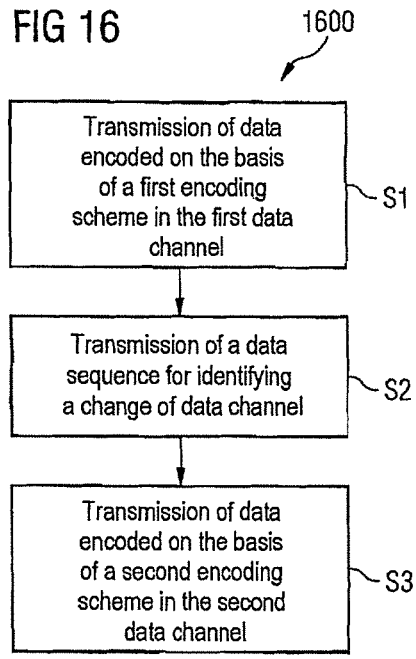

S1 — Transmission of data encoded on the basis of a first encoding scheme in the first data channel S2 — Transmission of a data sequence for identifying a change of data channel S3 — Transmission of data encoded on the basis of a second encoding scheme in the second data channel

FIG 17

| Logical channel type | Rx Data | Tx Data |
|---|---|---|
| Data channel A | 2.5G Primary (RED HOT A) | 2.5G |
| Data channel B | 2.5G Diversity (RED HOT A) | Reserved |
| Data channel C | 3G Primary | 3G 12 bit |
| Data channel D | 3G Diversity | Reserved |
| Data channel E | Reserved | 3G 16 bit |
| Data channel F | RED HOT B Primary | HUGE |
| Data channel H | RED HOT B Diversity | Reserved |

FIG 18

| 5 MS bits | 3 LS bits | Encoding |
|---|---|---|
| 00000 | 000 | HUGE A GMSK '0' |
| 00001 | 000 | HUGE A GMSK '1' |
| 00010...11110 | 000 | Reserved for future applications |
| 11111 | 000 | EOD; End of data symbol (see text) |
| 0, 0, 0, $d_{2i+1}$, $d_{2i}$ | 001 | HUGE B/C QPSK-modulated data need to be transmitted as original unmapped bits. The symbol mapping prescribed in 3GPP TS 45.004 rep. GERAN #34 needs to be performed by the RF IC. |
| 00100...11111 | 001 | Reserved for future applications |
| 0, 0, $d_{3i+2}$, $d_{3i+1}$, $d_{3i}$ | 010 | HUGE A 8PSK-modulated data need to be transmitted as original unmapped bits. The symbol mapping prescribed in section 3.2 in 3GPP TS 45.004 needs to be performed by the RF IC. |
| 01000...11111 | 010 | Reserved for future applications |
| 0, $d_{4i+3}$, $d_{4i+2}$, $d_{4i+1}$, $d_{4i}$ | 011 | HUGE A 16QAM-modulated data need to be transmitted as original unmapped bits. The symbol mapping prescribed in 3GPP TS 45.004 rep. GERAN #34 needs to be performed by the RF IC. |
| 10000...11111 | 011 | Reserved for future applications |
| 0, $d_{4i+3}$, $d_{4i+2}$, $d_{4i+1}$, $d_{4i}$ | 100 | HUGE B/C 16QAM-modulated data need to be transmitted as original unmapped bits. The symbol mapping prescribed in 3GPP TS 45.004 rep. GERAN #34 needs to be performed by the RF IC. |
| 10000...11111 | 100 | Reserved for future applications |
| $d_{5i+4}$, $d_{5i+3}$, $d_{5i+2}$, $d_{5i+1}$, $d_{5i}$ | 101 | HUGE C 32QAM-modulated data need to be transmitted as original unmapped bits. The symbol mapping prescribed in 3GPP TS 45.004 rep. GERAN #34 needs to be performed by the RF IC. |
| 00000...11111 | 110 | Reserved for future applications |
| 00000...11111 | 111 | Reserved for future applications |

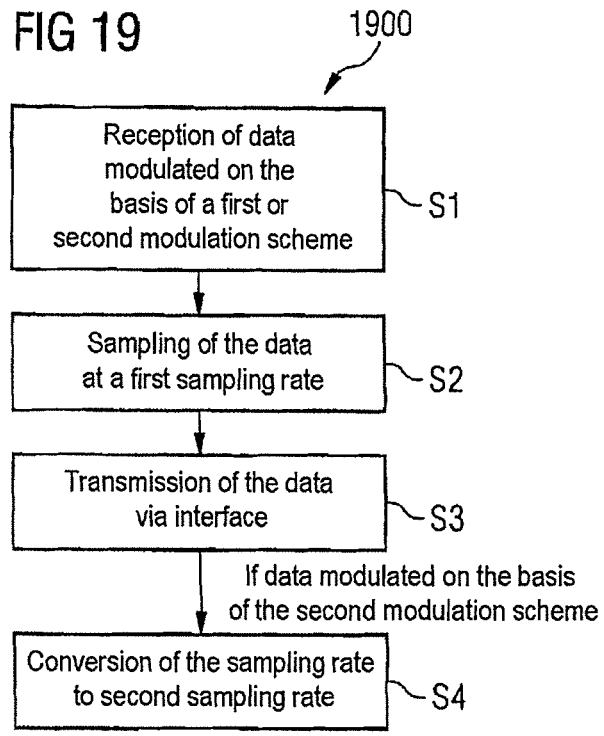
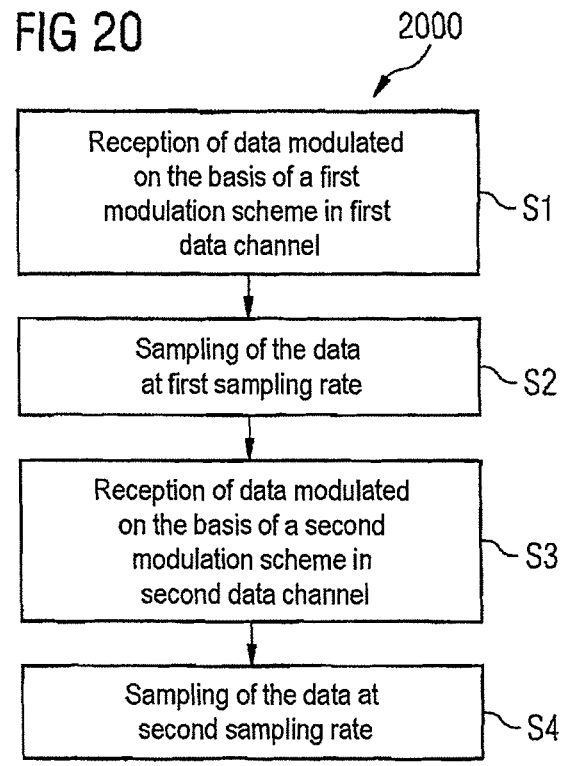

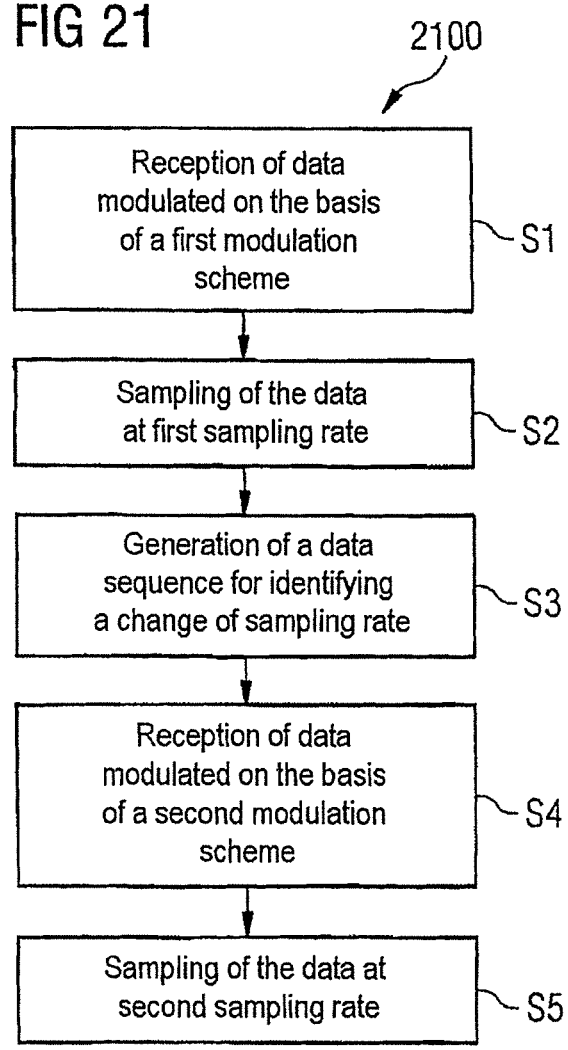

FIG 22

| Separator symbol | Channel and data type | Function |
|---|---|---|
| SOGA | Ch A, type A | Start of GSM/EDGE data in data channel A |
| SORA | Ch A, type B | Start of RED HOT data in data channel A |
| SOGB | Ch B, type A | Start of GSM/EDGE data in data channel B |
| SORB | Ch B, type B | Start of RED HOT data in data channel B |

FIG 23

| Type | Separator symbol | | | Payload data |
|---|---|---|---|---|
| | Sync pattern | Size 8 bits | Data channel | |
| SOGA | 1 0 1 0 1 0 0 0 0 1 0 0 1 0 1 1 0 0 0 0 | 0 1 0 0 | 0 1 0 0 | 0 0 0 0 0 0 0 0 0 |
| SORA | | | | 1 |
| SOGB | | | 0 1 0 1 | 0 |
| SORB | | | | 1 |

TRANSFER OF ENCODED DATA

REFERENCE TO RELATED APPLICATIONS

This application is a continuation of U.S. application Ser. No. 12/266,647 filed on Nov. 7, 2008, which claims priority to German application number 10 2007 053 828.8 filed on Nov. 12, 2007.

FIELD

The invention relates to a method and an apparatus for the transfer of encoded data.

BACKGROUND

Mobile radio transceivers may comprise baseband assemblies and radio-frequency assemblies which are coupled to one another via interfaces. The data transferred between a baseband assembly and a radio-frequency assembly via an interface may have been encoded in various ways. In this case, it is advantageous if the interface is compatible with a particularly large number of these types of encoding.

BRIEF DESCRIPTION OF THE DRAWINGS

The invention is explained in more detail below by way of example using embodiments with reference to the figures.

FIG. 2 shows a schematic illustration of a mobile radio transceiver 200 as one exemplary embodiment.

FIG. 3 shows a table with modulation schemes.

FIG. 4 shows a configuration graph for a 16 QAM modulation scheme.

FIG. 5 shows a configuration graph for a 32 QAM modulation scheme.

FIG. 6 shows a table with angles for configuration rotations for different modulation schemes.

FIG. 7 shows a schematic illustration of a burst 700.

FIG. 11 shows a table for encoding a data channel.

FIG. 12 shows a table for the use of data channels.

FIG. 13 shows a table for the encoding of data.

FIG. 14 shows a table for the 4-bit encoding of data.

FIG. 15 shows a table for the 8-bit encoding of data.

FIG. 16 shows a schematic flowchart for a method 1600 as one exemplary embodiment.

FIG. 17 shows a table for the use of data channels.

FIG. 18 shows a table for the 8-bit encoding of data.

FIG. 19 shows a schematic flowchart for a method 1900 as one exemplary embodiment.

FIG. 20 shows a schematic flowchart for a method 2000 as one exemplary embodiment.

FIG. 21 shows a schematic flowchart for a method 2100 as one exemplary embodiment.

FIG. 22 shows a table of data sequences.

FIG. 23 shows a table of data sequences.

DETAILED DESCRIPTION

Figure 1:
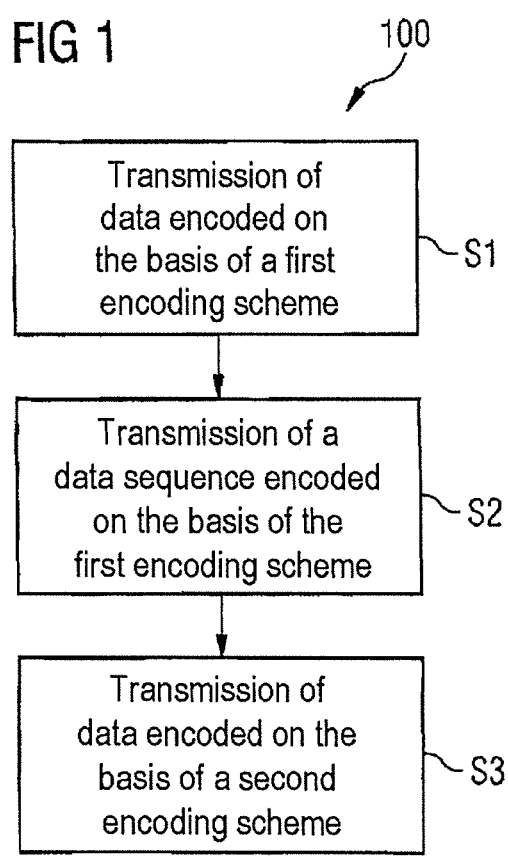
FIG. 1 shows a schematic flowchart for a method 100 as one exemplary embodiment.

In line with one embodiment, a method comprises transfer of data encoded on the basis of a first encoding scheme via an interface between a baseband assembly and a radio-frequency assembly in a mobile radio transceiver. The method further comprises transfer of a data sequence which is encoded on the basis of the first encoding scheme and which identifies a change of encoding scheme from the first encoding scheme to a second encoding scheme. Lastly, the method further comprises transfer of data encoded on the basis of the second encoding scheme via the interface.

In line with another embodiment, a method comprises transfer of data encoded on the basis of a first encoding scheme via an interface between a baseband assembly and a radio-frequency assembly in a mobile radio transceiver using a first data channel. The method further comprises transfer of a data sequence which identifies a change of data channel from the first data channel to a second data channel, and transfer of data encoded on the basis of a second encoding scheme via the interface using the second data channel. In one embodiment, the first encoding scheme is 4-bit encoding and the second encoding scheme is 8-bit encoding.

In line with another embodiment, a method comprises reception by a mobile radio transceiver of data modulated on the basis of a first or a second modulation scheme, and sampling of the received data at a first sampling rate associated with the first modulation scheme. The method further comprises transfer of the sampled data via an interface between a radio-frequency assembly and a baseband assembly in the mobile radio transceiver. The method also comprises conversion of the sampling rate of the transferred data in the baseband assembly to a second sampling rate, associated with the second modulation scheme, if the received data has been modulated on the basis of the second modulation scheme.

In line with another embodiment, a method comprises reception by a mobile radio transceiver of data modulated on the basis of a first modulation scheme using a first data channel, and sampling of the received data at a first sampling rate. The method further comprises reception by the mobile radio transceiver of data modulated on the basis of a second modulation scheme using a second data channel, and sampling of the received data at a second sampling rate. In one embodiment, the first modulation scheme is a modulation scheme used in the 2.5G standard and the second modulation scheme is a modulation scheme used in the TSG/GERAN standard.

In line with another embodiment, a method comprises reception by a mobile radio transceiver of data modulated on the basis of a first modulation scheme, and sampling of the received data at a first sampling rate. The method further comprises generation of a data sequence which identifies a change of sampling rate from the first sampling rate to a second sampling rate. In addition, the method comprises reception by the mobile radio transceiver of data modulated on the basis of a second modulation scheme, and sampling of the received data at the second sampling rate.

Embodiments are explained below with reference to the figures. To assist clarity, numerous specific details are presented below in order to convey a better understanding of one or more aspects of the embodiments. However, it is self-evident to a person skilled in the art that one or more embodiments can also be implemented with a smaller number of these specific details. Accordingly, the description which follows must not be understood to be restrictive. If a particular feature should be explicitly disclosed merely in terms of one specific embodiment, such a feature can be combined with one or more features of other embodiments as long as this is technically possible and appropriate for a particular embodiment.

FIG. 1 shows a schematic flowchart for a method 100 as one exemplary embodiment. The method 100 includes three steps S1, S2 and S3. In the first step S1, data encoded on the basis of a first encoding scheme is transferred via an interface between a baseband assembly and a radio-frequency assembly in a mobile radio transceiver. In the second step S2, a data sequence which is encoded on the basis of the first encoding scheme and which identifies a change of encoding scheme from the first encoding scheme to a second encoding scheme is transferred. In the third step S3, data encoded on the basis of the second encoding scheme is transferred via the interface.

The method 100 shown in FIG. 1 can be applied for data transfer via the interface in principle in both directions, i.e. from the baseband assembly to the radio-frequency assembly or vice versa. In addition, the method 100 also includes a converse change of encoding scheme, i.e. from the second encoding scheme to the first encoding scheme. In this way, it is possible to change over between the encoding schemes which are used as often as desired. Detailed examples of possible encoding schemes, the change of encoding and the design of the mobile radio transceiver are provided by the figures which follow and the description surrounding them.

FIG. 2 shows a schematic illustration of a mobile radio transceiver 200 as one exemplary embodiment. The illustration of the mobile radio transceiver 200 is qualitative and therefore does not need to include all the components which are required for the actual mobile radio operation of a mobile radio transceiver. The method 100 described by FIG. 1 can be read in connection with the mobile radio transceiver 200, in one embodiment.

The mobile radio transceiver 200 includes a baseband assembly 1 and a radio-frequency assembly 2 which are coupled to one another via an interface 3. In one embodiment, the interface 3 includes an interface 3a which is associated with the baseband assembly 1, an interface 3b which is associated with the radio-frequency assembly 2, and data lines 4a, 4b, 4c and 4d which couple the two interfaces 3a and 3b to one another.

The interface 3a of the baseband assembly 1 is connected to further components (not shown) of the baseband assembly 1 via signal paths (not shown). The data interchanged via the signal paths between the interface 3a and the further components of the baseband assembly 1 is indicated by data lines 5 in the form of arrows. The interchanged data may be payload or control data, for example.

The radio-frequency assembly 2 includes a first transmission path, connected to the interface 3b, with a first transmission unit 6a and a second transmission path, connected to the interface 3b, with a second transmission unit 6b. In addition, the radio-frequency assembly 2 includes a first reception path, connected to the interface 3b, with a first reception unit 7a and a second reception path, connected to the interface 3b, with a second reception unit 7b. The radio-frequency assembly 2 is coupled to an external local oscillator 8.

The baseband assembly 1 and the radio-frequency assembly 2 are in the form of two integrated circuits, i.e. implemented on physically separate substrates, in the embodiment in FIG. 2. In this case, the assemblies 1 and 2 are implemented in the form of two chips (which are frequently referred to as a baseband chip and a radio-frequency chip in the art). However, it is likewise possible in chip manufacture for the baseband assembly 1 and the radio-frequency assembly 2 to be implemented on a common substrate in one embodiment.

The baseband assembly 1 processes signals in baseband, while the radio-frequency assembly 2 processes signals at least in part in a radio-frequency band. Within the baseband assembly 1, digital signal processing takes data to be transferred and produces and processes a low-frequency baseband signal. This signal is processed further within the radio-frequency assembly 2 and is shifted to a radio frequency by the latter's components.

It should be noted that the separation between baseband assembly 1 and radio-frequency assembly 2 is not standard in mobile radio engineering and not well-defined. One possibility of distinguishing the baseband assembly 1 and the radio-frequency assembly 2 from one another may be provided by the implementation of a standardized interface 3, for example, as is shown in the mobile radio transceiver 200 in FIG. 2. By way of example, the interface 3 may be based on the DigRF Dual-Mode Baseband/RF IC interface standard, which defines a physical connection between baseband assemblies and radio-frequency assemblies in mobile radio transceivers. In this case, a DigRF interface provides logical channels for payload data, control data and data for time control (timing) for the components of the baseband assembly 1 and the radio-frequency assembly 2.

The baseband assembly 1 may include different components, which are not shown explicitly in FIG. 2. An example of one such component for digital signal processing within the baseband is a digital signal processor. Typical method steps for signal processing the baseband assembly 1 are the encoding or interleaving of data to be transferred by the mobile radio transceiver 200, for example. In addition, the baseband assembly 1 may include a sampling unit for sampling a signal, for example.

The components of the radio-frequency assembly 2 process signals at least in part in the radio-frequency band, this processing being able to be either of a digital nature or of an analogue nature. The transmission units 6a, 6b and the reception units 7a, 7b of the radio-frequency assembly 2 may be in any form and may include both analogue and digital standard components. By way of example, the transmission units 6a, 6b may include a transmitted signal path with one or more digital filters for filtering the transmitted signals, a digital/analogue converter for converting the digital transmitted signal into an analogue signal, a modulator based on a particular modulation scheme, an up-conversion mixer, for shifting the analogue transmitted signal to the radio-frequency band, a channel filter for filtering the radio-frequency signal and a power amplifier for outputting the amplified signal to a transmission antenna (not shown).

The reception units 6a, 6b may include a received signal path with a channel filter fed by an antenna (not shown), a down-conversion mixer for down-converting filtered received signals to an intermediate band or to the baseband, a demodulator based on a particular modulation scheme, a sampling unit for sampling a signal, an analogue/digital converter for converting the analogue received signal into a digital signal, and one or more filters for filtering the received signals.

Since the radio-frequency assembly 2 includes a plurality of transmission paths and a plurality of reception paths, the mobile radio transceiver 200 is a multimode system. The transmission and reception paths can process (modulate, filter, etc.) transmitted resp. received data on the basis of various mobile radio standards. By way of example, these may be the mobile radio standards UMTS (Universal Mobile Telecommunications System) and GSM (Global System for Mobile Communications)/EDGE (Enhanced Data Rates for GSM Evolution), that is to say 2G standards, 2.5G standards or 3G standards. In addition, data can be processed and transferred within the framework of the TSG GERAN (GSM/EDGE Radio Access Network) standard.

The data processed in the baseband assembly 1 are transferred via the data lines 4a, which may be, in one embodiment, in the form of differential line pairs, for example, from the interface 3*a* of the baseband assembly 1 to the interface 3*b* of the radio-frequency assembly 2. Here, the data transfer can take place in serial, digital and packet-oriented form. The data received by the interface 3*b* are processed in the relevant transmission path on the basis of the chosen mobile radio standard so as then to be emitted by one or more transmission antenna (not shown). The processing in the radio-frequency assembly 2 includes, inter alia, modulation of the data to be transferred on the basis of a modulation scheme which is used within the framework of the chosen mobile radio standard.

In the radio-frequency assembly 2, data received via one or more antennas (not shown) are processed in the respective reception path on the basis of the chosen mobile radio standard. By way of example, the processing includes sampling of the received signal and demodulation of received data. The interface 3*b* receives the data processed in the radio-frequency assembly 2 and transfers them via the data lines 4*b*, which may be, in one embodiment, in the form of differential line pairs, for example, to the interface 3*a* of the baseband assembly 1. Here, said data transfer can take place in serial, digital and packet-oriented form.

The interfaces 3*a* and 3*b* are also coupled to one another by the data lines 4*c* and 4*d*. The data line 4*c* is used, in one embodiment, to transmit the system clock generated by the local oscillator 8 from the radio-frequency assembly 2 to the baseband assembly 1. If the baseband assembly 1 requires the system clock, it can request it from the radio-frequency assembly 2 using a control signal.

The data transferred between the interfaces 3*a* and 3*b* via the data lines 4*a* and 4*b* may have been encoded on the basis of various encoding schemes, depending on the mobile radio standard used. During data transfer between the interfaces 3*a* and 3*b*, it is possible, in principle, for the mobile radio standard used to be changed, which can result in a change of encoding scheme used. Such a change of encoding scheme can be based on the method 100 in FIG. 1, in which first of all the data encoded on the basis of a first encoding scheme are transferred via the interface 3 between the baseband assembly 1 and the radio-frequency assembly 2. If there is a change of encoding scheme, this is identified by the transfer of a data sequence which is still encoded on the basis of the first encoding scheme. Subsequently, data encoded on the basis of a second encoding scheme is then transferred via the interface 3.

A change of mobile radio standard used can result in a change of the modulation scheme used for modulating data in the radio-frequency assembly 2. Here, data encoded on the basis of a first encoding scheme, which is used before the encoding scheme is changed, are modulated on the basis of a first modulation scheme and data encoded on the basis of a second encoding scheme, which is used after the encoding scheme is changed, are modulated on the basis of a second modulation scheme.

If the transfer of the data sequence announcing a change of encoding scheme results in changeover of the modulation scheme used, the signal processing in the radio-frequency assembly 2 needs to be customized accordingly. This may result, by way of example, in changeover between modulators based on various modulation schemes or in changeover between signal paths which contain such modulators. In addition, the radio-frequency assembly 2 may include a memory (not shown), in one embodiment a FIFO (First In First Out) memory, for receiving data, wherein the changeover of the modulation scheme prompts customization of the mode of operation of the memory, particularly of the word length used by the memory.

By way of example, the mobile radio standards supported by the mobile radio transceiver 200 may be the GSM/EDGE standard, in which transmitted data are modulated on the basis of the GMSK (Gaussian Minimum Shift Keying) scheme or on the basis of the 8-PSK (Phase Shift Keying) scheme. The symbol rate used within the framework of the GSM/EDGE standard is approximately 270.833 kHz. In addition, the mobile radio transceiver 200 may support the TSG GERAN standard, which, in contrast to the GSM/EDGE standard, also includes higher-order modulation schemes for the data modulation. The modulation schemes used within the framework of the TSG GERAN standard are known under the concepts RED HOT (Reduced Symbol Duration, Higher Order Modulation and Turbo Coding) in the reception direction (downlink) and HUGE (Updated New WID on Higher Uplink Performance for GERAN Evolution) in the transmission direction (uplink) from the point of the view of the mobile station. All modulation schemes are contemplated as falling within the scope of the present invention.

Within the RED HOT scheme, a distinction is drawn between the RED HOT A scheme and the RED HOT B scheme for the reception direction, whereas within the HUGE scheme, a distinction is drawn between the schemes HUGE A, HUGE B and HUGE C for the transmission direction. The schemes RED HOT A and HUGE A use the aforementioned symbol rate of the GSM standard of approximately 270.833 kHz, while the schemes RED HOT B, HUGE B and HUGE C use a higher symbol rate of approximately 325 kHz. The modulation schemes used by the individual RED HOT and HUGE schemes are summarized in the table in FIG. 3: GMSK, 8-PSK, QPSK (Quadrature Phase Shift Keying), 16 QAM (Quadrature Amplitude Modulation) and 32 QAM.

In the modulation schemes indicated in FIG. 3, a binary data stream is encoded into symbols or configuration points according to the modulation scheme used. FIGS. 4 and 5 show the configuration graphs and the configuration points in the 16 QAM scheme and in the 32 QAM scheme by way of example. These modulation schemes are an amplitude modulation of two orthogonal carriers of the same frequency. The amplitudes of the two carriers are indicated by two Cartesian coordinates in FIGS. 4 and 5. FIGS. 4 and 5 reveal that in 16 QAM modulation it is possible to transmit 4 bits per symbol or configuration point in the modulation scheme and in 32 QAM modulation it is possible to transmit 5 bits per symbol or configuration point in the modulation scheme.

To reduce the crest factor (i.e. the ratio between the peak value and the RMS value (peak-to-average ratio)) of a data transfer using a particular modulation scheme, the configuration graph for the modulation scheme can be rotated by a particular angle from symbol to symbol during the transfer. The rotation angles for various modulation schemes are indicated in the table in FIG. 6.

In the case of the GSM/EDGE standard, the symbols of the GMSK scheme or of the 8-PSK scheme which are generated from a binary stream are transferred in the form of what are known as (data) bursts within a transfer slot (slot). The structure of such a burst 700, as is generated in the radio-frequency assembly 2, is shown in FIG. 7. The first data field which may be referred to as a first data sequence 9 ("Tail") in the burst 700 includes bits for identifying the start of the burst. The next data field 10 ("Encrypted bits") contains payload to be transferred, such as voice data. The data field 11 ("Training sequence") includes a bit pattern, which is known both to the transmitter and to the receiver, for correcting signal distortions which have arisen on account of the Doppler effect or multipath propagation. The data field 12 ("Encrypted bits") which follows the data field 11 again contains payload and corresponds to the data field 10 in terms of its format. The data field 12 is followed by a data field 13 ("Tail") for identifying the end of the burst. The data field 14 ("Guard") at the end of the burst 700 contains no data and prevents successive bursts 700 from overlapping.

The data transfer within the aforementioned RED HOT and HUGE schemes takes place in similar fashion to the data transfer within the GSM/EDGE standard in the form of bursts 700 as shown in FIG. 7. If the length of the transfer slot is constant, the different symbol rates (RED HOT A, HUGE A: approximately 270.833 kHz; RED HOT B, HUGE B, HUGE C: approximately 325 kHz) mean that, depending on the scheme used, different burst formats with a different number of symbols need to be used. In this case, it should be pointed out that the modulation schemes with the associated burst formats can be combined with one another as desired in a multislot transfer.

Figures 8, 9, 10:
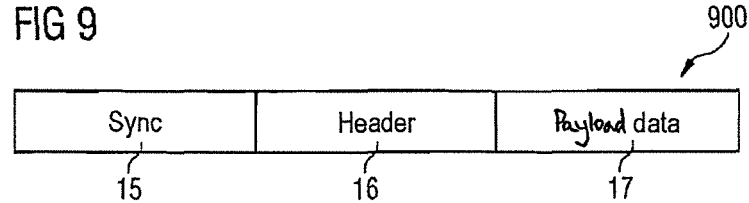
FIG. 8 shows a table with burst formats.
FIG. 9 shows a schematic illustration of a data packet 900.
FIG. 10 shows a table for encoding a data packet size.

The table in FIG. 8 indicates the burst formats used in the RED HOT scheme and the HUGE scheme, with different numbers of symbols. The table should be read in connection with the burst 700 in FIG. 7, whose data fields 9 to 14 are listed in the first column of the table. In the second column, these data fields have been associated to the number of symbols contained therein for the case of a data transfer based on the RED HOT A scheme and the HUGE A scheme. A burst 700 during a RED HOT A or HUGE A transfer accordingly includes 156.25 symbols in total. When the 16 QAM modulation scheme is used, in which 4 bits are encrypted per symbol, this corresponds to a length of 625 bits. In the third column, the data fields in the burst 700 have been associated to the number of symbols contained therein for the case of data transfer on the basis of the RED HOT B, HUGE B or HUGE C scheme. A burst during a RED HOT B, HUGE B or HUGE C transfer accordingly includes 187.5 symbols. When the 16 QAM modulation scheme is used, this corresponds to a length of 750 bits.

To be able to generate a burst 700 in the radio-frequency assembly 2 of the mobile radio transceiver 200, the interface 3 of the mobile radio receiver 200 needs to be used to transmit the burst format, the symbol duration, the modulation scheme and the payload data which is to be transferred. Conversely, samples of 16-bit width, separated into real and imaginary parts, need to be transferred at a 2-fold oversampling rate in the reception direction. On account of the symbol rates of approximately 270.833 kHz and approximately 325 kHz which are used in the RED HOT and HUGE schemes, respectively, the result is therefore sampling rates of approximately 541.666 kHz and approximately 650 kHz in the case of two-fold oversampling.

FIG. 9 shows a schematic illustration of a data packet ("frame") 900, as is used for a data transfer via the interface 3 of the mobile radio transceiver 200 on the basis of the aforementioned DigRF standard. The data packet 900 includes three data fields having data sequences 15, 16 and 17. The data field 15 ("sync") includes 16 bits for synchronizing the clock phase. The data field 16 ("Header") including 8 bits that contains information about the size of the data packet and about the data channel used for transferring the data packet. The data field 17 includes payload data to be transferred, such as symbols as shown in FIG. 13, 14 or 15, which are yet to come, in the transmission direction or samples in the reception direction.

The Header 16 includes three bits for identifying the size of the data packet 900 and four bits for identifying the data channel used. The encoding of the three bits for identifying the size of the data packet 900 is shown in FIG. 10. The first column of the table shown therein indicates the possible 3-bit strings, while the second column indicates the size of the payload data contained in the data packet 900 (cf. data field 17) in bits. The third column indicates the total size of the data packet 900 in bits. The bit string 111 is not used and is not associated with any particular data packet size (cf. "reserved" in the second column) in one embodiment.

The encoding of the four bits for identifying the data channel used is shown in FIG. 11. The first column of the table shown indicates the 4-bit strings identifying the data channel, while the second column indicates the possible data channels. The data channels associated with the bit strings 0000, 0001 and 0010 are logical channels used in the DigRF standard, which are not explained in more detail at this point. The data channels A to H (cf. "data channel") associated with the bit strings 0100, 0101, 0110, 0111, 1000, 1001, 1010, 1011 are logical channels for sending and receiving data in the 2.5G standard and in the 3G standard. The remaining bit strings are not associated with any particular data channel (cf. "reserved" in the second column).

FIG. 12 shows the use of the data channels A to H on the basis of the DigRF standard. The first column of the table shown indicates the logical data channel, while the second column indicates the reception mode associated with the respective data channel. The labels "2.5G Primary" and "3G Primary" are primary data received in the 2.5G standard and in the 3G standard, respectively. The labels "2.5G Diversity" and "3G Diversity" identify the reception of diversity data in the 2.5G standard and in the 3G standard, respectively. Thus, if primary data are received during a 3G data transfer, for example, the data channel C is used for this. The third column indicates the transmission mode associated with the respective logical channel. Here, the label "3G 12 bit" identifies the transfer of transmitted data of 12-bit width in the 3G standard, for example. Some of the indicated data channels are not used and are not associated with any particular transmission mode (cf. "reserved" in the second and third column).

FIG. 13 shows a table for 4-bit encoding of data in a 2.5G transfer in the transmission direction. Such a data transfer is effected on the basis of the DigRF standard, by definition, in a data stream including 4-bit data sequences, wherein the most significant bit of a data sequence is sent first, the payload data includes 256 bits (cf. bit string 101 in FIG. 10) and the data channel A is used for the data transfer (cf. FIG. 12). The first column of the table indicates the possible bit strings for the three most significant (MS) bits, while the second column indicates the value of the least significant (LS) bit. The information encoded by the 4-bit strings is indicated in the third column.

The bit strings 0000 and 0001 can stipulate whether the transferred data need to be modulated in the radio-frequency assembly 2 on the basis of the GMSK scheme. The bit string 1110 identifies the end of a data packet. The indexed symbols $d_{3i+2}$, $d_{3i+1}$ and $d_{3i}$ can each assume the value 0 or 1 and, in combination with a value 1 for the least significant bit, represent the eight symbols resp. configuration points in the 8-PSK modulation scheme. These symbols encode payload data, such as voice data. The remaining bit strings are not used and are not associated with any particular information (cf. "reserved" in the third column) in one embodiment.

Within the context of FIG. 1, a description has already been given to the effect that during transfer of encoded data between the interface 3a of the baseband assembly 1 and the interface 3b of the radio-frequency assembly 2 the encoding scheme used can change. A detailed exemplary embodiment of such a change of encoding will be described below. This is an exemplary change from 4-bit encoding to 8-bit encoding.

First of all, the encoding schemes on which the exemplary embodiment is based will be described by FIGS. 14 and 15.

FIG. 14 shows 4-bit encoding of data such as can be transferred by the interface 3. The association of the 4-bit sequences in FIG. 14 is identical to the encoding in FIG. 13, apart from the bit string associated with the data sequence 1100. Whereas the data sequence 1100 in FIG. 13 was not associated with any information (cf. "reserved" in the third column in FIG. 14), the data sequence 1100 in FIG. 14 identifies a change of encoding scheme from the 4-bit encoding scheme in the present table to another encoding scheme. This other encoding scheme on which the data transfer is based may be based particularly on the HUGE scheme. Such a change is indicated in the third column by the label SOH (Start Of HUGE). An example of the other encoding scheme is provided by FIG. 15 and the description surrounding it. It should be pointed out that it is also possible to use another of the as yet unused data sequences (cf. "reversed" in FIG. 13) for the data sequence (SOH) which identifies the change of encoding.

FIG. 15 shows 8-bit encoding of data such as can be transferred via the interface 3. The encoding shown is, in particular, compatible with a data transfer within the framework of the HUGE standard. The first column of the table indicates the possible strings of the five most significant bits. The second column of the table indicates the possible strings of the three least significant bits. The information which the 8-bit data sequences include is indicated in the third column.

The 8-bit strings 00000000 and 00001000 can be used to decide whether the transferred data need to be modulated in the radio-frequency assembly 2 on the basis of the GMSK scheme. The 8-bit string 11110000 identifies a change of encoding scheme from the encoding scheme in the present table to another encoding scheme. The other encoding scheme may be the encoding scheme from FIG. 14, in one embodiment. The change of encoding scheme is indicated in the third column by the label EOH (End Of HUGE). The 8-bit string 11111000 identifies the end of a transferred data packet. This is indicated in the third column by the label EOD (End Of Data).

The payload to be transferred is encoded in the encoding scheme in FIG. 15 by the five most significant bits, while the modulation scheme used for the modulation in the radio-frequency assembly 2 is encoded in the three least significant bits. Here, a value 000 for the three least significant bits identifies modulation on the basis of the GMSK scheme, a value of 001 identifies modulation on the basis of the QPSK scheme, a value of 010 identifies modulation on the basis of the 16 QAM scheme and a value of 101 identifies modulation on the basis of the 32 QAM scheme.

The indexed symbols ($D_{2i}$, $d_{2i+1}$, $d_{3i}$, etc.) can each assume the value 0 or 1 and are the symbols resp. configuration points in the modulation scheme which is identified by the values of the three least significant bits. If the data need to be modulated on the basis of the QPSK scheme, for example, the value of the three least significant bits is set to 001 and the payload data is encoded by the two bits with the fourth and fifth highest significances. The three bits with the highest significance are set constantly to the value 0 in the case of modulation on the basis of the QPSK scheme. If the data need to be modulated on the basis of the 16 QAM scheme, for example, the value of the three least significant bits is set to the value 100 and the payload data is encoded up to the most significant bit by the four further bits from the five most significant bits. The bit with the highest significance is set constantly to the value 0 in the case of modulation on the basis of the 16 QAM scheme in one embodiment. Some of the bit strings in the table are not used and are not associated with any particular information (cf. "reserved" in the third column).

It should be pointed out that, in one embodiment, the data sequences SOH, EOH and EOD may also be associated with the other sequences from the unused data sequences (cf. "reserved" in the third column of the table in FIG. 13). In addition, the modulation schemes used can be associated with the three least significant bits in another way in further exemplary embodiments.

Instead of using the symbol EOD in the 8-bit format, it is also possible to use a sequence of EOH and EOD in the 4-bit format. In this embodiment, the transfer of HUGE data in the case of implementations of the interface 3 which are merely able to evaluate the EOD symbol in the 4-bit format remains completely transparent, i.e. the interface itself can continue to be used unchanged.

In the case of data transfer via the interface 3, there may be a change between the encoding schemes in FIGS. 14 and 15 in line with the method 100 in FIG. 1. In this context, data encoded on the basis of the encoding scheme in FIG. 14 are first of all transferred via the interface 3 and processed in the radio-frequency assembly 2 on the basis of the GSM/EDGE standard, i.e. modulated on the basis of the GSMK scheme or on the basis of the 8-PSK scheme. In the event of a change of the mobile radio standard used from the GSM/EDGE standard to the TSG GERAN standard, there is a change from the encoding scheme in FIG. 14 to the encoding scheme in FIG. 15. This change is identified by the transfer of the data sequence SOH (cf. bit string 1100 in FIG. 14). If the data sequence SOH is transferred via the interface 3, there is a change of encoding scheme from the encoding scheme in FIG. 14 to the encoding scheme in FIG. 15. If the three least significant bits in FIG. 15 identify a modulation scheme which is not supported by the GSM/EDGE standard, there may also be a change of modulation scheme used in the radio-frequency assembly 2.

It should be pointed out that data which need to be modulated on the basis of the GMSK scheme or on the basis of the 8-PSK scheme in the radio-frequency assembly 2 can alternatively be transferred within the framework of the 4-bit encoding in FIG. 14 or within the framework of the 8-bit encoding in FIG. 15. GMSK and 8-PSK symbols can accordingly be transferred outside or inside a symbol sequence in the HUGE standard. In the case of a multislot mode, a symbol sequence in the HUGE standard can also be inserted directly above packet limits into a 4-bit encoded data sequence.

FIG. 16 shows a schematic flowchart for a method 1600 for the transfer of encoded data via the interface 3 as one exemplary embodiment. The method 1600 includes three steps S1, S2 and S3. In the first step S1, data encoded on the basis of a first encoding scheme is transferred via the interface 3 between the baseband assembly 1 and the radio-frequency assembly 2 of the mobile radio transceiver 200 using a first data channel. In the second step S2, a data sequence which identifies a change of data channel from the first data channel to a second data channel is transferred. In the third step S3, data encoded on the basis of a second encoding scheme is transferred via the interface 3 using the second data channel, wherein the first encoding scheme is 4-bit encoding and the second encoding scheme is 8-bit encoding.

The method 1600 shown in FIG. 16 can be applied for a data transfer via the interface 3 in principle in both directions, i.e. from the baseband assembly 1 to the radio-frequency assembly 2 or vice versa. In addition, the method 1600 also includes a converse change of encoding scheme, i.e. from the second encoding scheme to the first encoding scheme respectively, from the second data channel to the first data channel.

This means that it is possible to change over as often as desired between the encoding schemes used and the data channels used. A detailed example of a possible embodiment of the method 1600 is provided by FIGS. 17 and 18 which follow and the description surrounding them.

FIG. 17 shows a table for the use of data channels for a data transfer in line with the method 1600. The table largely corresponds to the table in FIG. 12, identical use being made of the data channels A to E in both tables. Furthermore, for the reception mode of the data channels A and B, it has been indicated in FIG. 17 that these two channels are also used for the RED HOT A scheme, since this uses the symbol rate (approximately 270.833 kHz) of the GSM/EDGE standard.

Whereas the data channel F was not used in FIG. 12, in FIG. 17 it is associated with the reception of primary data within the framework of the RED HOT B scheme. In addition, the data channel F is associated with the transfer of HUGE data. Another difference from FIG. 12 is the use of the data channel H. While this data channel was not used in FIG. 12, in FIG. 17 it is associated with the reception of diversity data within the framework of the RED HOT B scheme. The data channel H remains unused for the transmission mode, as in FIG. 12. It should be noted that instead of the data channels F and H it is also possible to use the other, unused data channels for the data transfer within the framework of the RED HOT B and HUGE schemes.

FIG. 18 shows 8-bit encoding of data such as can be transferred via the interface 3. The 8-bit encoding shown is particularly compatible with a data transfer in line with the HUGE standard. The table shown largely corresponds to the table in FIG. 15. Unlike this table, it does not include a bit string for identifying a change of encoding scheme. In FIG. 15, such a bit string was provided by the value 11110000 (cf. EOH in FIG. 15), which by contrast is not used in FIG. 18. Other 8-bit encoding options in the method 1600 are provided by a changed association of the symbol EOD with another of the unused bit strings, for example. In addition, in other exemplary embodiments, the possible modulation schemes may be associated with the three least significant bits in another way.

During mobile radio operation, there may be a change of encoding schemes and of the data channel used in line with the method 1600. Such a change of encoding can occur between the encoding schemes in FIGS. 13 and 18, for example. During a transfer in line with the encoding scheme in FIG. 13, the data in the radio-frequency assembly 2 are first of all processed on the basis of the GSM/EDGE standard, i.e. modulated on the basis of the GMSK scheme or on the basis of the 8-PSK scheme. Such a data transfer in the transmission direction is performed within the data channel A in line with the association in FIG. 17. If the mode of operation of the mobile radio transceiver 200 changes from the GSM/EDGE standard to the TSG GERAN standard, there is a change from data transfer using the data channel A to data transfer using the data channel F. This involves a change from the encoding scheme in FIG. 13 to the encoding scheme in FIG. 18.

The change of data channel is identified by the transfer of a data sequence as may be provided by the four bits which identify the data channel from FIG. 11, for example. These four bits are contained in the Header 16 of the data packet 900 in FIG. 9. When said data sequence is transferred by the interface 3, there is a change of data channel from the data channel A to the data channel F and hence a change of the 4-bit encoding scheme in FIG. 13 to the 8-bit encoding scheme in FIG. 18. In the data channel F, the data are transferred exclusively on the basis of the encoding scheme in FIG. 18. If the transfer of the data sequence announcing a change of data channel results in the modulation scheme used being changed over, signal processing in the radio-frequency assembly 2 needs to be customized by changing over between modulators or signal paths, for example.

In contrast to the method 100, the transfer of a data sequence in the method 1600 means that no change of encoding scheme in the actual sense is achieved. Rather, a change of the data channel used is achieved, in which another encoding scheme is used. The information that a data transfer within the framework of the HUGE standard is involved is therefore not contained in the actual payload, but rather in the Header 16 of the transferred data packet 900. This requires an accordingly changed evaluation of the information contained in the Header in the interface 3. The sequences SOH and EOH in FIGS. 14 and 15 are not needed in the method 1600. It should be pointed out that a transfer of GMSK and 8-PSK symbols within the framework of the 8-bit encoding always results in an increased memory requirement in the baseband assembly 1 and/or the radio-frequency assembly 2.

FIG. 19 shows a schematic flowchart for a method 1900 for the transfer of encoded data via the interface 3 as one exemplary embodiment. The method 1900 includes four steps S1, S2, S3 and S4. In the first step S1, data modulated on the basis of a first or second modulation scheme is received at the mobile radio transceiver 200. In the second step S2, the received data is sampled at a first sampling rate associated with the first modulation scheme. In the third step S3, the sampled data is transferred via the interface 3 between the radio-frequency assembly 2 and the baseband assembly 1 of the mobile radio transceiver 200. In the fourth step S4, the transferred data is sampled in the baseband assembly 1 at a second sampling rate, which is associated with the second modulation scheme, if the received data has been modulated on the basis of the second modulation scheme.

In one exemplary embodiment of the method 1900, the first modulation scheme may be a modulation scheme used in the 2.5G standard, particularly a GMSK scheme or an 8-PSK scheme. For this case, on the basis of FIG. 3, a data transfer based on the RED HOT A scheme may be involved. The second modulation scheme may be a modulation scheme which is used in the TSG/GERAN standard, particularly a GMSK scheme or a QPSK scheme or an 8-PSK scheme or a 16 QAM scheme or a 32 QAM scheme. For this case, on the basis of FIG. 3, data transfer based on the RED HOT B may be involved.

For data reception in the course of a 2.5G transfer, the received data are sampled on the basis of the DigRF standard in symbol sizes of 16 bits of I(Inphase) data and 16 bits of Q(Quadrature) data at a two-fold oversampling. Here, the first transferred sample from a data packet is supposed to be a sampled I value. The sampled values are combined in the form of data packets with 256 bits of payload data. The data channel A is intended to be used for transferring primary data, and the data channel B is intended to be used for transferring diversity data.

Following this definition of the DigRF standard, modulated data received within the framework of the RED HOT A scheme should be sampled at double the frequency of the underlying symbol rate (approximately 270.833 kHz), that is to say at approximately 541.666 kHz. Similarly, modulated data received within the framework of the RED HOT B scheme should be sampled at double the frequency of the underlying symbol rate (approximately 325 kHz), that is to say at approximately 650 kHz.

In the case of data reception within the framework of the RED HOT A or RED HOT B scheme, in step S1 of the method 1900 the received modulated data are initially sampled at a sampling rate of approximately 541.666 kHz, regardless of the scheme used. Even for the case of reception of data modulated on the basis of the RED HOT B scheme, which actually requires a sampling rate of approximately 650 kHz, a sampling rate of approximately 541.666 kHz satisfies Nyquist's sampling theorem. The sampled data is then transferred via the interface 3 from the radio-frequency assembly 2 to the baseband assembly 1.

If the received data is RED HOT B data, it is usually necessary to increase the sampling rate from approximately 541.666 kHz to approximately 650 kHz. This is done by converting the sampling rate in the baseband assembly 1 to the required sampling rate of approximately 650 kHz. If the received data are RED HOT A data, the desired sampling rate of 541.666 kHz is already in place, i.e. conversion of the sampling rate in the baseband assembly 1 is no longer necessary. In the method 1900, it is particularly advantageous that in a multislot mode it is not necessary to draw a distinction between RED HOT A and RED HOT B data reception in the radio-frequency assembly 2 and on the interface 3, since sampling rate conversion, if required, is performed in the baseband assembly 1.

FIG. 20 shows a schematic flowchart for a method 2000 for the transfer of encoded data via the interface 3 as one exemplary embodiment. The method 2000 includes four steps S1, S2, S3 and S4. In the first step S1, data modulated on the basis of a first modulation scheme is received by the mobile radio transceiver 200 using a first data channel. In the second step S2, the received data is sampled at a first sampling rate. In the third step S3, data modulated on the basis of a second modulation scheme is received by the mobile radio transceiver 200 using a second data channel. In the fourth step S4, received data is sampled at a second sampling rate, wherein the first modulation scheme is a modulation scheme used in the 2.5G standard and the second modulation scheme is a modulation scheme used in the TSG/GERAN standard.

In one exemplary embodiment of the method 2000, the first modulation scheme may be a GMSK scheme or an 8-PSK scheme, in particular. For this case, on the basis of FIG. 3, data transfer based on the RED HOT A scheme may be involved. The second modulation scheme may be a GMSK scheme or a QPSK scheme or an 8-PSK scheme or a 16 QAM scheme or a 32 QAM scheme, in particular. For this case, on the basis of FIG. 3, data transfer based on the RED HOT B scheme may be involved.

Data received within the framework of the RED HOT A scheme can be sampled at a sampling rate of approximately 541.666 kHz and received in the data channel A (primary data) and data channel B (diversity data) (cf. FIG. 17). Data received within the framework of the RED HOT B scheme can be sampled at a sampling rate of approximately 650 kHz and received in the data channel F (primary data) and data channel H (diversity data) (cf. FIG. 17). In this case, it should be noted that other data channels from the unused data channels can also be used for receiving the RED HOT B data.

When different sampling rates are used, the radio-frequency assembly 2 needs to be notified of the sampling rate that needs to be used to generate the I values and Q values. Accordingly, it must be possible to distinguish between the successive samples (particularly in the case of a multislot mode) on the interface 3. To this end, it would be possible to change the sampling rate after an agreed number of samples, for example. For this case, the baseband assembly 1 and the radio-frequency assembly 2 would need to count along in sync from the start of a data transfer.

FIG. 21 shows a schematic flowchart for a method 2100 for a transfer of encoded data via the interface 3 as one exemplary embodiment. The method 2100 includes five steps S1, S2, S3, S4 and S5. In the first step S1, data modulated on the basis of a first modulation scheme is received by the mobile radio transceiver 200. In the second step S2, the received data is sampled at a first sampling rate. In the third step S3, a data sequence modulated on the basis of the first modulation scheme is received by the mobile radio transceiver 200 and identifies a change of sampling rate from the first sampling rate to a second sampling rate. In the fourth step S4, data modulated on the basis of a second modulation scheme is received by the mobile radio transceiver 200. In the fifth step S5, received data is sampled at the second sampling rate.

In one exemplary embodiment of the method 2100, the first modulation scheme may be a GMSK scheme or an 8-PSK scheme, in particular. For this case, on the basis of FIG. 3, data transfer based on the RED HOT A scheme at an associated sampling rate of approximately 541.666 kHz may be involved. The second modulation scheme may be a GMSK scheme or a QPSK scheme or an 8-PSK scheme or a 16 QAM scheme or a 32 QAM scheme, in particular. For this case, on the basis of FIG. 3, data transfer based on the RED HOT B scheme at a sampling rate of approximately 650 kHz may thus be involved.

The data sequence identifying the change of sampling rate from approximately 541.666 kHz to approximately 650 kHz or vice versa may be a separator symbol whose format does not arise in customary reception of payload data. For the case of 2.5G reception based on the DigRF standard, the prescribed size of the payload data in the data packet is 256 bits (cf. bit string 101 in FIG. 10). An example of a separator symbol identifying the change of sampling rate may thus be a data packet with a length which differs from this size, for example.

FIG. 22 shows a table of data sequences for identifying a change of sampling rate. The first column indicates the name of the data sequence resp. of the separator symbol. The second column indicates the data channel identified by the data sequence (channel A or B) and the data transfer scheme (RED HOT A or B). In the third column, the data sequences in the first column have their respective function associated with them.

The abbreviations SOGA, SORA, SOGB and SORB for the data sequences from the first column come from the entries in the third column. By way of example, the data sequence called SOGA identifies the start of a data transfer within the framework of the GSM/EDGE standard using the data channel A (cf. "Start Of GSM/EDGE data in data channel A" in the third column). The entry in the second column which is associated with the data sequence SOGA accordingly indicates the data channel A for the data channel used. Since this is a transfer based on the GSM/EDGE standard, the second column indicates the RED HOT A scheme (type A) for the data transfer scheme.

FIG. 23 shows data sequences for identifying a change of sampling rate. The first column indicates the name of the data sequence resp. of the separator symbol. In the second column, the data sequences in the first column have a respective associated data packet in the form of a bit string. In terms of their structure, the data packets in FIG. 23 correspond to the data packet 900 in FIG. 9.

A first data field ("Sync Pattern") includes 16 bits for synchronizing the clock phase, wherein the 16-bit string 1010100001001011 indicated in FIG. 23 is prescribed by the DigRF standard. A second data field ("Header") includes eight bits, wherein the first three bits stipulate the size of the payload data within the data packet. The indicated value of 000 identifies a payload data size of 8 bits, in line with FIG.

10. The next four bits of the Header identify the data channel used for the data transfer. For the case of the data sequences SOGA and SORA, these involve the data channel A identified by the bit string 0100, whereas the data sequences SOGB and SORB involve the data channel B identified by the bit string 0101. The last bit of the Header is set to the value 0. A third data field includes the payload data including eight bits, wherein the first seven bits are all set to the value 0. The last bit of the payload data, with its possible values 0 and 1, distinguishes the respective data sequences SOGA and SORA resp. the data sequences SOGB and SORB.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising." Also, exemplary is merely intended to mean an example, rather than the best.

What is claimed is:

1. A method of transferring data, comprising:
    transferring mobile communication data encoded on the basis of a first encoding scheme via an interface between a mobile communication baseband assembly and a radio-frequency assembly of a mobile radio transceiver using a first data channel;
    when the transferred data comprises a particular data sequence that identifies a change of data channel from the first data channel to a second data channel, transferring mobile communication data encoded on the basis of a second, different encoding scheme via the interface between the mobile communication baseband assembly and the radio-frequency assembly using the second data channel,
    wherein the transfer of the particular data sequence initiates a changeover between a first modulation scheme for modulating the data encoded on the basis of the first encoding scheme and a second, different modulation scheme for modulating the data encoded on the basis of the second encoding scheme in the radio-frequency assembly.

2. The method of claim 1, wherein the data sequence comprises a header comprising an identifier for the data channel change.

3. The method of claim 2, wherein the header comprises eight bits and four of the eight bits identify the second data channel.

4. The method of claim 2, wherein the transfer of the header prompts the change of data channel.

5. The method of claim 1, wherein one of the first and second modulation schemes is a QPSK or 8 PSK modulation scheme.

6. The method of claim 1, wherein one of the first and second modulation schemes is a 16 QAM or 32 QAM modulation scheme.

7. The method of claim 1, wherein the transferred data is transmitted data.

8. The method of claim 1, wherein the data sequence is transferred over the first data channel before the change of data channel and is transferred over the second data channel after the change of data channel.

9. A mobile radio transceiver, comprising:
    a mobile communication baseband assembly;
    a radio-frequency assembly; and
    an interface between the mobile communication baseband assembly and the radio-frequency assembly, wherein the interface is configured to transfer mobile communication data encoded on the basis of a first encoding scheme using a first data channel, transfer a data sequence which identifies a change of data channel from the first data channel to a second data channel, and transfer mobile communication data encoded on the basis of a second encoding scheme between the mobile communication baseband assembly and the radio-frequency assembly using the second data channel, wherein the transfer of the data sequence comprises a changeover between a first modulation scheme and a second, different modulation scheme.

10. The mobile radio transceiver of claim 9, wherein the baseband assembly and the radio-frequency assembly are implemented on a common substrate.

11. The mobile radio transceiver of claim 9, wherein the data sequence is transferred over the first data channel before the change of data channel and is transferred over the second data channel after the change of data channel.

* * * * *